(12) United States Patent
Sun et al.

(10) Patent No.: US 12,152,418 B2
(45) Date of Patent: Nov. 26, 2024

(54) VEHICLE MICRO-ACTUATOR APPLIED TO AUTOMOTIVE FUEL TANK COVER OR CHARGING BOX COVER

(71) Applicant: Ningbo Huakai Electronic Technology Co. LTD., Ningbo (CN)

(72) Inventors: Yunfei Sun, Ningbo (CN); Junchen Zhou, Ningbo (CN)

( * ) Notice: Subject to any disclaimer, the term of this patent is extended or adjusted under 35 U.S.C. 154(b) by 106 days.

(21) Appl. No.: 17/615,004

(22) PCT Filed: Dec. 9, 2020

(86) PCT No.: PCT/CN2020/134713
§ 371 (c)(1),
(2) Date: Nov. 29, 2021

(87) PCT Pub. No.: WO2021/129387
PCT Pub. Date: Jul. 1, 2021

(65) Prior Publication Data
US 2022/0316243 A1 Oct. 6, 2022

(30) Foreign Application Priority Data
Dec. 27, 2019 (CN) .......................... 201911379132.9

(51) Int. Cl.
*E05B 83/34* (2014.01)
*B60K 15/05* (2006.01)
(Continued)

(52) U.S. Cl.
CPC .............. *E05B 83/34* (2013.01); *B60K 15/05* (2013.01); *E05B 81/06* (2013.01); *E05B 81/16* (2013.01);
(Continued)

(58) Field of Classification Search
CPC .......... E05B 77/34; E05B 81/06; E05B 81/14; E05B 81/16; E05B 81/18; E05B 81/28;
(Continued)

(56) References Cited

U.S. PATENT DOCUMENTS

| 2,469,283 | A | * | 5/1949 | Steele | ..................... E05B 83/34 292/216 |
| 8,398,127 | B2 | * | 3/2013 | Persiani | ................ E05C 19/022 292/137 |

(Continued)

*Primary Examiner* — Christopher J Boswell
(74) *Attorney, Agent, or Firm* — Addison D. Ault; Richard P. Moerschell; IPGentleman Intellectual Property Services, LLC

(57) ABSTRACT

An automobile micro actuator, which applies to the cover of an automobile fuel tank or the cover of a charging case, includes a casing with a motor chamber and a locking chamber. The motor chamber has electric locking components that include a motor, transmission components and locking components. The locking chamber has manual locking components that include a rotary push rod, a driving sleeve and a rotary sleeve. The locking components comprise a locking base in the motor chamber, a locking tab for locking the rotary sleeve, and a hook arm for connecting the locking base and locking tab. A passage suitable for the hook arm is provided between the motor chamber and locking chamber. The wall of the locking chamber is provided with a locking hole connected with the passage. The locking tab can pass through the locking hole and form an interference fit with the rotary sleeve.

7 Claims, 7 Drawing Sheets

(51) Int. Cl.
  *E05B 81/06* (2014.01)
  *E05B 81/16* (2014.01)
  *E05B 81/28* (2014.01)
  *E05B 81/34* (2014.01)
  *E05B 77/34* (2014.01)
  *E05B 81/44* (2014.01)
(52) U.S. Cl.
  CPC .............. *E05B 81/28* (2013.01); *E05B 81/34* (2013.01); *E05B 77/34* (2013.01); *E05B 81/44* (2013.01)
(58) Field of Classification Search
  CPC .......... E05B 81/34; E05B 81/42; E05B 81/44; E05B 83/28; E05B 83/34; B60K 15/05; B60K 2015/0561; B60K 2015/0569; B60K 2015/0584
  See application file for complete search history.

(56) References Cited

U.S. PATENT DOCUMENTS

| | | | |
|---|---|---|---|
| 10,006,230 B2* | 6/2018 | Nam | E05B 81/06 |
| 10,730,386 B2* | 8/2020 | Persiani | E05B 83/34 |
| 10,919,382 B2* | 2/2021 | Kato | E05B 83/34 |
| 11,459,804 B2* | 10/2022 | Inose | E05B 81/28 |
| 11,485,222 B2* | 11/2022 | Noda | E05B 81/56 |
| 11,773,631 B2* | 10/2023 | Kuwayama | E05B 83/34 |
| | | | 292/144 |
| 2018/0162219 A1* | 6/2018 | Lee | E05B 81/34 |
| 2024/0011337 A1* | 1/2024 | Yoshida | E05B 83/34 |

* cited by examiner

VEHICLE MICRO-ACTUATOR APPLIED TO AUTOMOTIVE FUEL TANK COVER OR CHARGING BOX COVER

TECHNICAL FIELD

The patent for invention relates to the technical field of automobile parts, in particular to a micro actuator for a vehicle applied to the cover of an automobile fuel tank or the cover of a charging case.

BACKGROUND TECHNOLOGY

Nowadays, with the development of the automobile industry and the improvement of automobile popularity, people have higher and higher requirements for automobile performance, and more and more attention to the velocity, convenience and safety of various operations of vehicles. Therefore, it is particularly important for automobile enterprises to improve vehicle structure and apply new technology.

In most conventional structures, the small fuel filler door or the small charging door is locked or unlocked mechanically, that is, the lock rod is fixed on the small door, the lock sleeve is fixed on the body seat, and the locking and unlocking is done by pressing or pulling the cable, which is easily affected by external factors and leads to misoperation.

Some of the existing R&D personnel have made improvements to the conventional structures. For the opening and closing of the small fuel filler door, the mechanical locking structure and the electric locking structure are integrated on one actuator to open and close the small filler door In a prior patent application of the applicant (patent application No.: 201810201464.7, patent name: a micro actuator assembly for a vehicle), the vehicle has the electric locking and mechanical locking functions, and the electric locking protects the mechanical locking, playing the role of anti-theft protection and preventing misoperation; the mechanical locking function is done through a rotary push rod, rotary sleeve, driving sleeve and clamp spring; the electric locking function is done through a motor, non-standard gear ring and locking pin; a dual-spring component force structure is enabled through the support base, base cover and two springs, which provides adjustable gear force and small gear impact force, and reduces the noise generated when the actuator is opened and closed.

But the existing structure also has some disadvantages. The locking structure is a through-hole which is opened on the inner wall between the locking chamber and the motor chamber, and the locking pin stretches into the locking chamber from the through-hole. In this structure, the most obvious disadvantages are as follows: 1. The locking pin locks the rotary push rod directly, and the rotary push rod is directly connected with the cover of the automobile fuel tank during use, so the force when opening and closing is large, which leads to the large interaction force between the locking pin and the rotary push rod, and increases the risk of wear and tear of parts; 2. The locking chamber is directly connected with the motor chamber, and the motor has no sealing structure. When the external water vapor enters the locking chamber through the dynamic clearance between the rotary push rod and the base under the negative pressure formed by the expansion and contraction of the rotary push rod inside and outside the actuator, the water vapor is likely to enter the motor chamber through the through-hole. As the motor in the motor chamber may be exposed to humid conditions for a long time, the internal metal elements may rust, so the motor may malfunction and, result in the functional failure of the actuator; 3. The electric locking part needs to be shut down when the electric vehicle is being charged for a long time. When the electric locking part needs to be started, it is necessary to enter the vehicle to start the electric locking part first before shutting down and locking the mechanical locking part outside the vehicle, and finally shut down and lock the electric locking part again.

Invention Content

In order to overcome the above disadvantages of the prior art, the present invention provides a micro actuator for a vehicle applied to the cover of an automobile fuel tank or the cover of a charging case.

The technical scheme of the present invention to solve the technical problem is as follows: A micro actuator for a vehicle applied to the cover of an automobile fuel tank or the cover of a charging case, which comprises a casing. The casing comprises a motor chamber and a locking chamber. The described motor chamber is provided with electric locking components. The described electric locking components comprise a motor, transmission components and locking components from top to bottom. The described motor is in communication connection with the automobile electronic control system. The described locking chamber is provided with manual locking components. The described manual locking components comprise a rotary push rod, a driving sleeve and a rotary sleeve from top to bottom. The described rotary push rod is in transmission connection with the cover of the automobile fuel tank. The described electric locking components can lock the described manual locking components. The described locking components comprise a locking base in the motor chamber and in transmission connection with transmission components, a locking tab in the locking chamber for locking the rotary sleeve, and a hook arm for connecting the locking base and the locking tab. A passage suitable for the hook arm is provided between the described motor chamber and the locking chamber. The wall of the described locking chamber is provided with a locking hole suitable for the described locking tab. The described passage is connected with the described locking hole, which is facing the described rotary sleeve. The described locking tab can pass through the described locking hole and form an interference fit with the described rotary sleeve.

Preferably, the described locking hole is located on the side of the described locking chamber away from the motor chamber.

Preferably, the end of the described passage is provided with a baffle in a protruding way. A limit bar is provided in the described passage near the baffle. A slideway is formed between the described baffle and limit bar, which is connected to the described locking hole. The described locking tab is provided with a limit slider in a protruding way, which is provided in the described slideway in a sliding way.

Preferably, the wall of the described locking chamber is provided with several internal studs. The guiding grooves are formed between the adjacent internal studs. Each internal stud is provided with a locking mouth. A first inclined plane and a second inclined plane with the same inclination direction are provided on both sides of the lock opening. The described first inclined plane is inclined toward the described lock opening. The described second inclined surface is inclined toward the described guide groove;

Several guide bars are provided on the outer side of the described rotary sleeve. A third inclined surface with the same inclination direction as the first inclined surface is provided on the upper end of the guide bars. A locking gap is formed between adjacent guide bars. The described locking tab can be inserted into the locking gap and form an interference fit with the described guide bars;

A guide surface suitable for the third inclined surface is provided on the lower end of the described driving sleeve;

It also comprises a first spring and a second spring. The described rotary push rod is provided with a casing. A support base is provided in the described casing. The described first spring is provided on the described support base in a sleeve-type way. A support rod is provided on the described casing in a protruding way. The described second spring is provided on the described support rod in a sleeve-type way. One end of the support rod extends into the described casing and can be butted with the described support base;

The described transmission components comprise a gear provided on the output shaft of the described motor, a non-standard gear ring meshed with the described gear, and a cam provided on the described non-standard gear ring. The described locking base is provided with a linkage groove. The described cam is located in the described linkage groove and forms an accessible connection with the described locking base.

Preferably, the described motor chamber is also provided with a gear ring seat. The described gear ring seat is provided with a gear ring chamber suitable for the gear ring seat. A shaft hole is provided at the bottom of the described gear ring chamber. The described non-standard gear ring is provided with a connecting shaft downward in a protruding way. The described connecting shaft passes through the described shaft hole and extends out of the gear ring seat. The described cam is provided on the described connecting shaft in a sleeving way.

Preferably, several support feet are provided at the bottom of the described casing. The described gear ring seat is erected on the described support feet. Sealing components are also provided between the described gear ring seat and the support feet. The described sealing components comprise several layers of annular flexible glue and a pad integrally formed with the annular flexible glue. The described pad is cut with an opening corresponding to the described shaft hole. A skirt is provided on the edge of the described opening, which is butted with the described connecting shaft and forms an interference fit.

Preferably, the described gear ring seat is also provided with a motor sealing seat. The described motor is provided on the described motor sealing seat.

Preferably, a spiral sliding groove is cut on the outer surface of the described rotary push rod. Raised sliding points are provided on the inner surface of the described locking chamber. The described sliding points are provided in the described spiral chute in a sliding way. The sliding points and the spiral chute cooperate to make the described rotary push rod rotate when extending into or ejecting from the described locking chamber.

Preferably, a fixing part is provided integrally on the upper end of the described rotary sleeve. The described fixing part is inserted into the described casing. The described fixing part is provided with a ring groove. The described rotary push rod is provided with a fixing hole. A clamp spring is provided in the described fixing hole in a clamping way. The described clamp spring is clamped into the described ring groove. Pressing the described rotary push rod can drive the described rotary sleeve to rotate.

Preferably, an access opening is provided on the side surface of the described casing, which is facing the described clamp spring. A through-hole connected with the described passage is provided at the bottom of the described access opening.

The Present Invention has the Following Beneficial Effects:

1. The existing structure that the locking tab is directly locked with the rotary push rod is canceled, and the new structure that the locking tab locks the rotation of the rotary sleeve is changed. Since the rotary sleeve is located at the component of the last link of the manual locking components, the interaction force between the locking tab and the rotary sleeve is relatively small, which can effectively reduce the risk of wear and tear of parts.

2. In the utility model, the locking tab protects the mechanical lock by preventing the rotation of the rotary sleeve, so as to avoid false triggering. Therefore, the electric locking mechanism can operate, lock and unlock no matter if the vehicle is charging or if the small door of the fuel tank cap is opened or closed. The advantage of this structure in practical application is that in the process of the vehicle charging or refueling, when the vehicle is locked, the actuator can lock using the electric locking function while keeping the mechanical part unlocked. After charging or refueling, the small door of the cap can be closed directly. At this time, the mechanical and electric parts are locked, unlike the in the case of a conventional vehicle that the car is started, the electric control part is started, then the small door of the cap is closed, and finally the electric part is controlled to lock.

3. The special structural design of the connecting part of the electric locking part and the manual locking part with the coordination of the hook arm and the passage can delay and prevent some water vapor from entering the motor chamber, and reduce the risk of corrosion and damage to the motor due to water invasion.

4. The motor can be effectively isolated and protected by the sealing components with a special structure and motor sealing seat. The configuration of the skirt makes the connecting shaft and the sealing components butted to obtain a seamless effect. It can provide better sealing performance on the premise of normal operation.

5. The electrical structure is combined with the mechanical structure, and the defects of the existing technology are improved to achieve the locking or unlocking of the small door of the filler cap or the charging cap. The structure is simple and practical. It avoids misoperation, plays the role of security, and increases the safety of the mechanism. Moreover, it improves the stability of the mechanism, reduces the friction and interference between the moving mechanisms when they return, effectively reduces the impact force and noise, and further improves the service life, safety and comfort of the whole product.

SPECIFIC EMBODIMENT

The present invention will be further described in detail based on the drawings and a specific embodiment.

Figure 1:
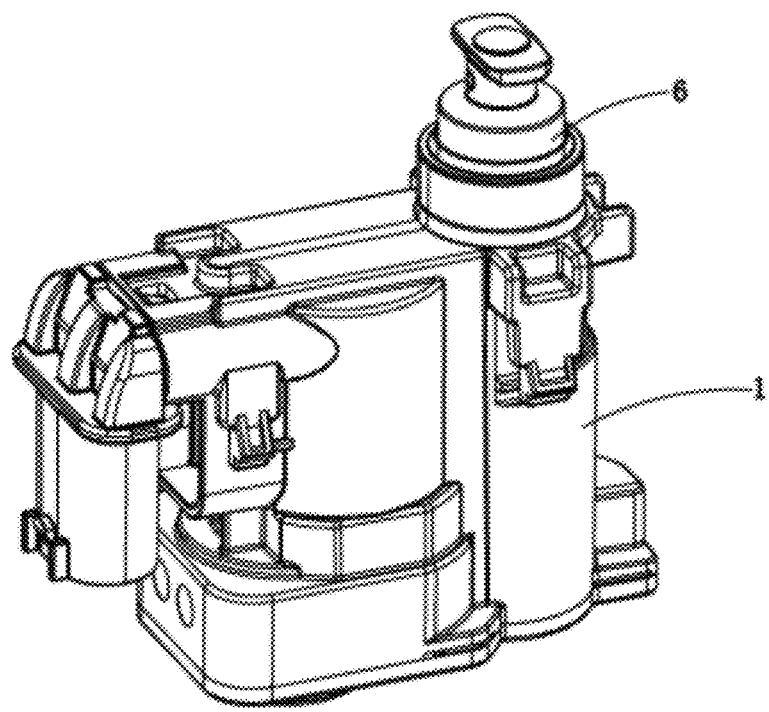
FIG. 1 is a structural diagram of the present invention.
Figure 2:
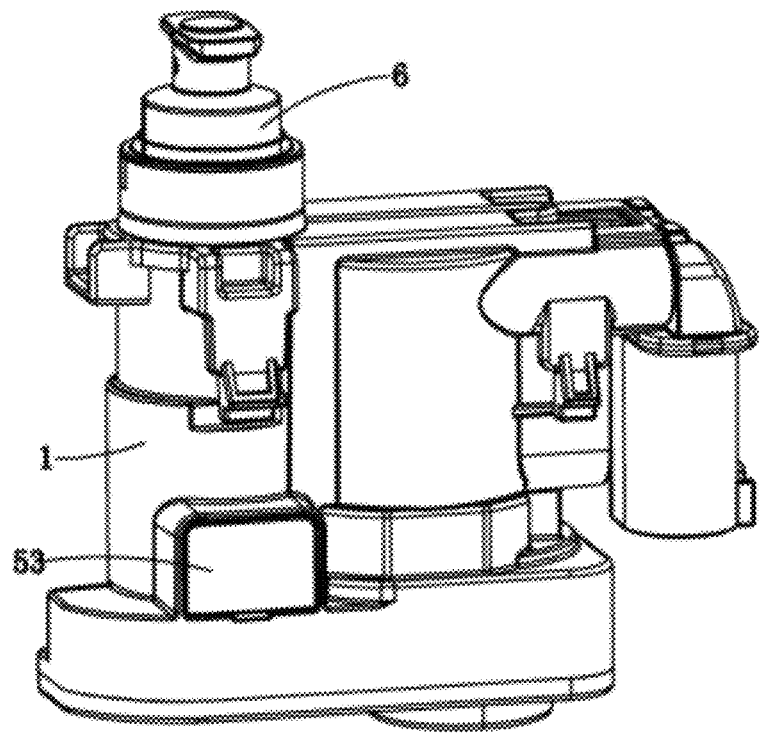
FIG. 2 is a structural diagram of the present invention from another angle.
Figure 3:
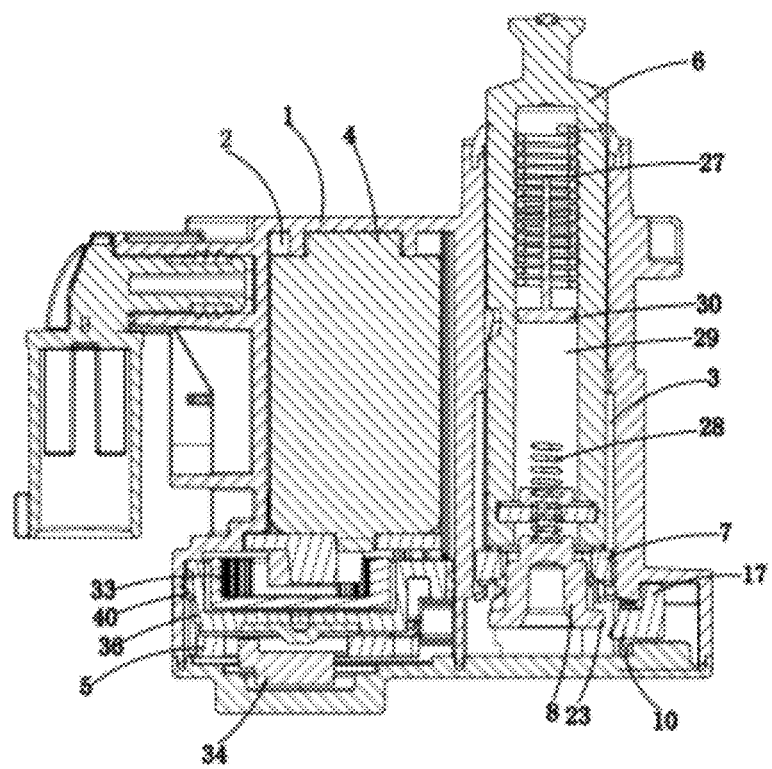
FIG. 3 is a sectional view of the present invention.
Figure 4:
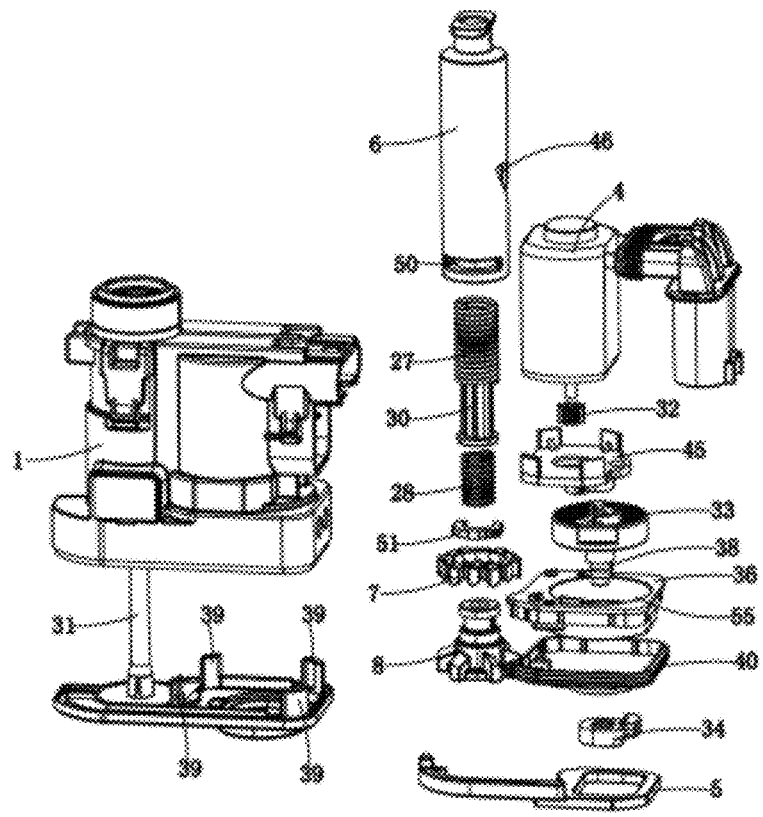
FIG. 4 is an exploded view of the present invention.
Figure 5:
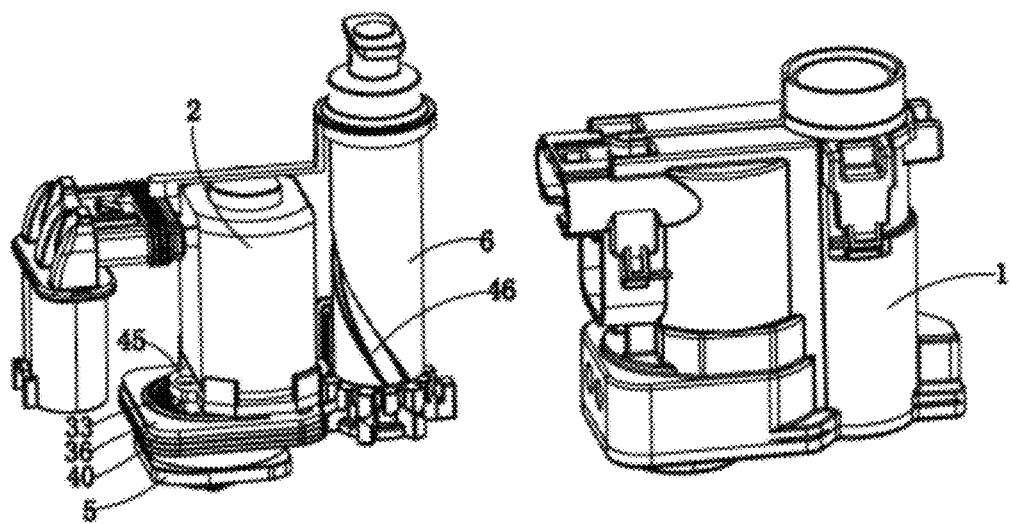
FIG. 5 is a partial exploded view of the present invention.
Figure 6:
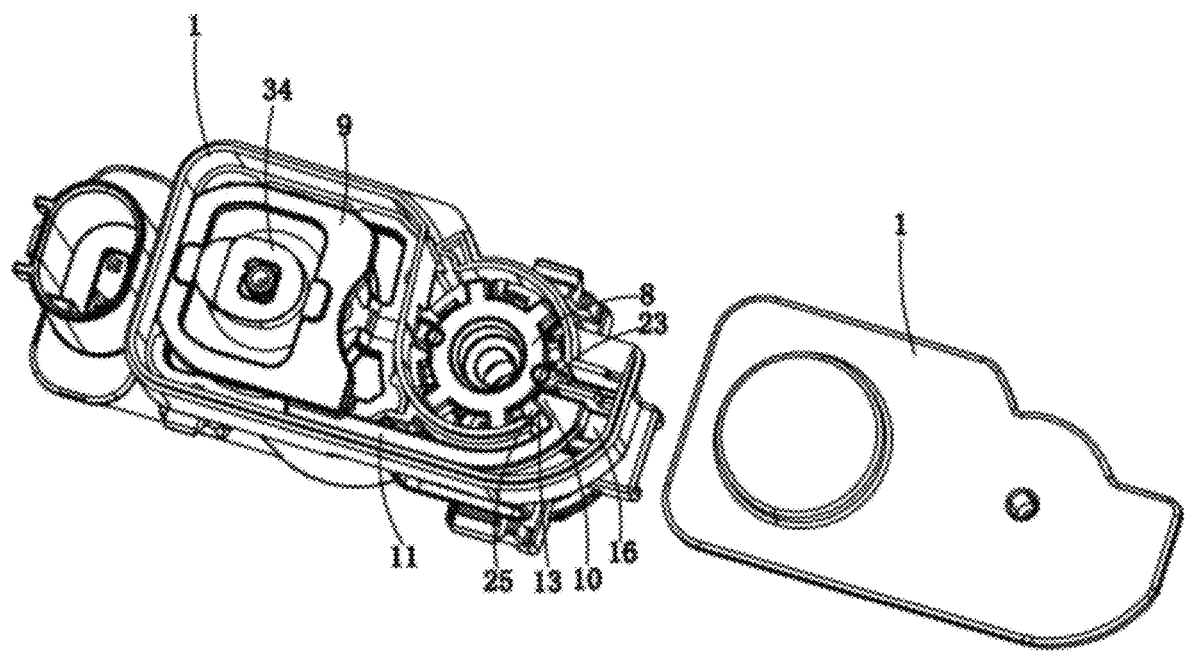
FIG. 6 is another partial exploded view of the present invention.
Figure 7:
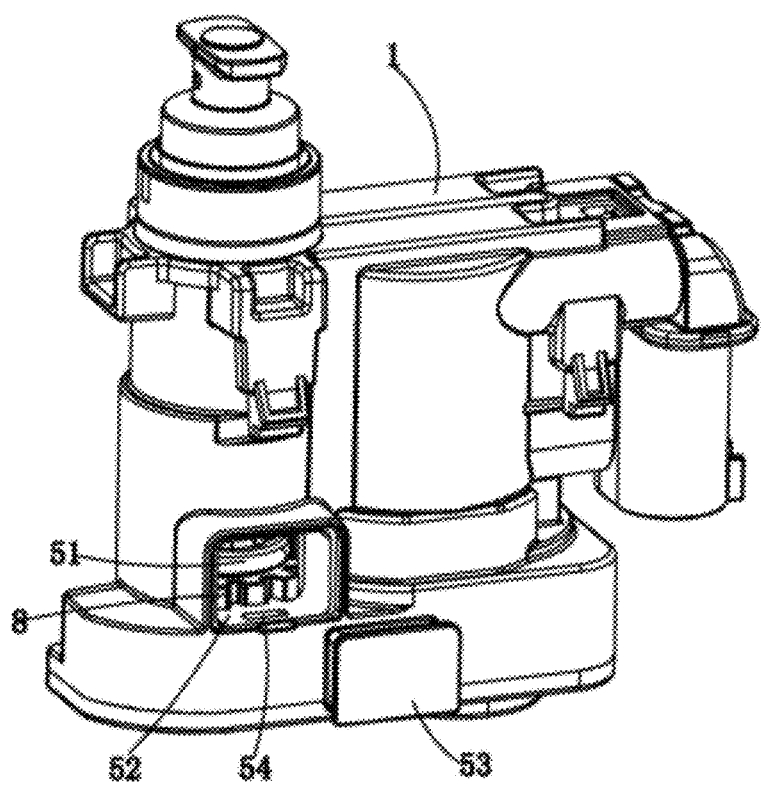
FIG. 7 is another partial exploded view of the present invention.
Figure 8:
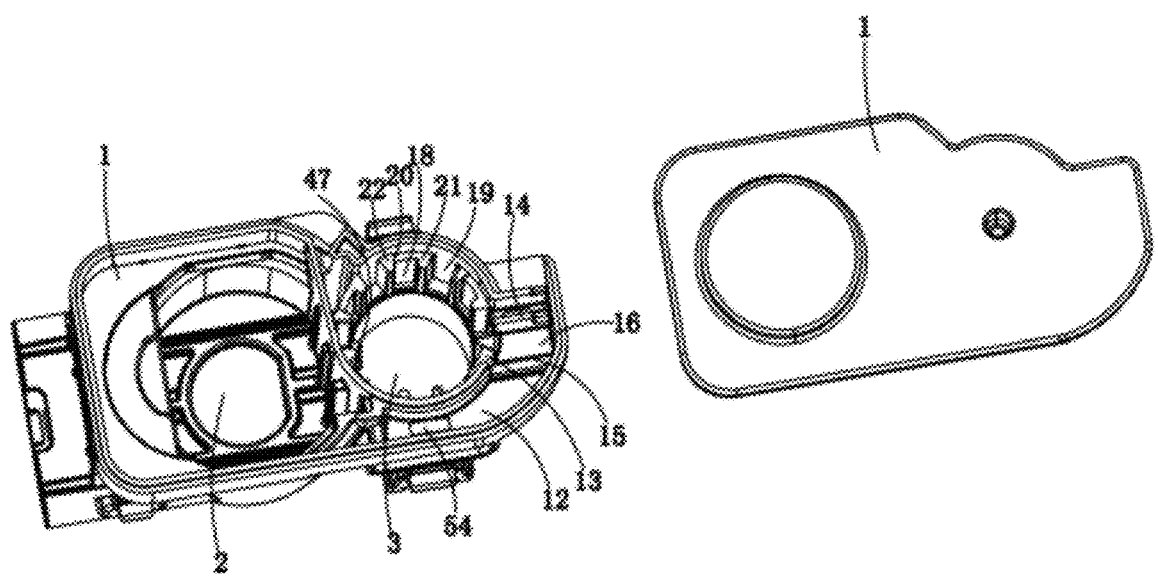
FIG. 8 is an exploded view of the casing.
Figure 9:
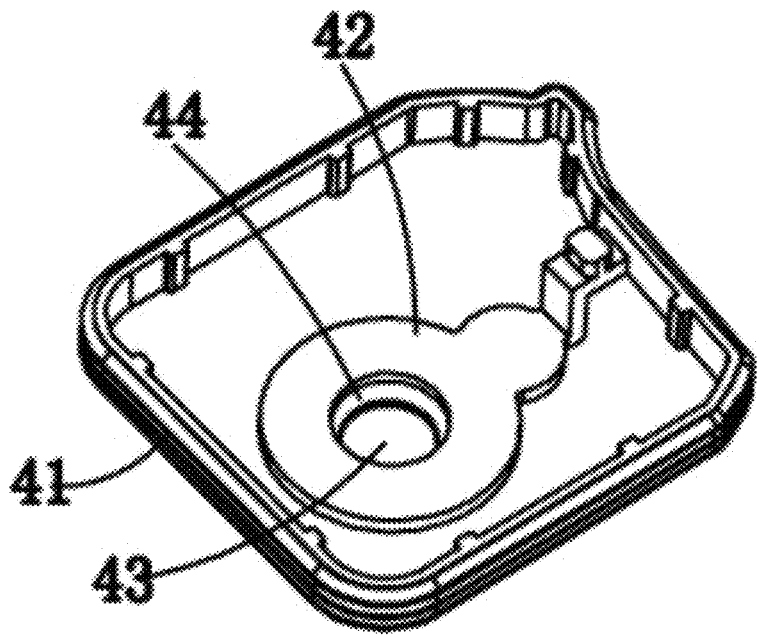
FIG. 9 is a structural diagram of the sealing components.
Figure 10:
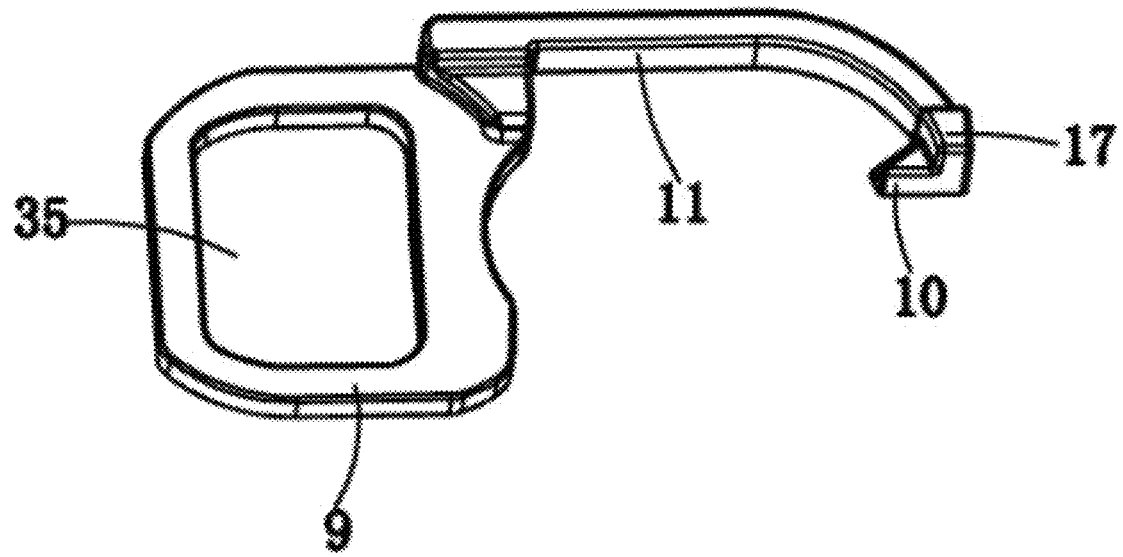
FIG. 10 is a structural diagram of the locking components.
Figure 11:
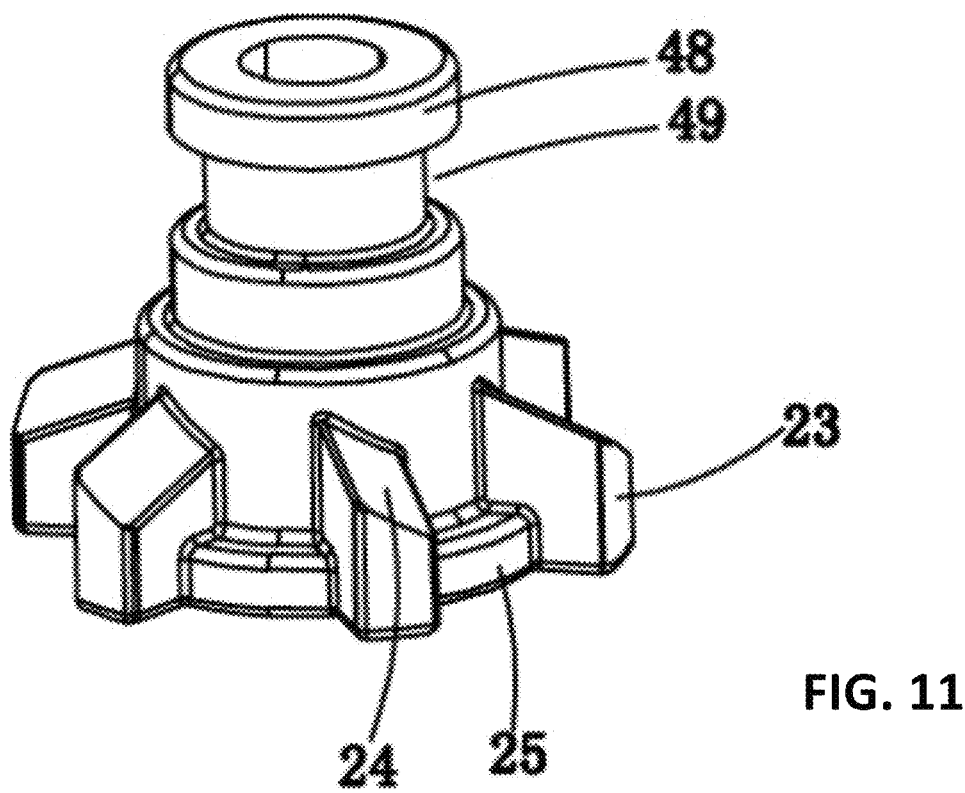
FIG. 11 is a structural diagram of the rotary sleeve.
Figure 12:
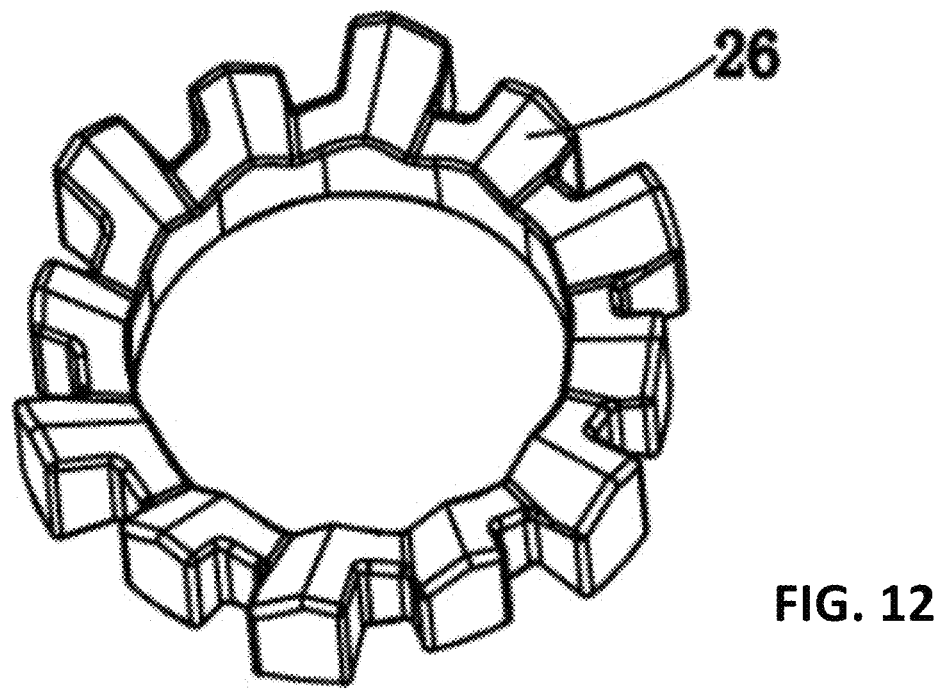
FIG. 12 is a structural diagram of the driving sleeve.
Figure 13:
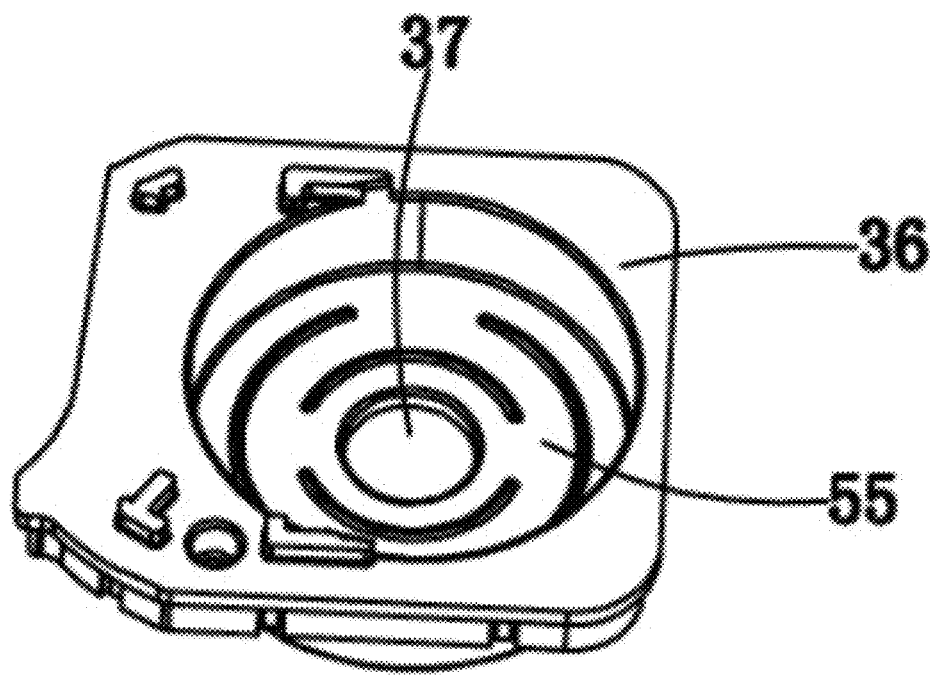
FIG. 13 is a structural diagram of the gear ring seat.

Referring to FIG. 1 to FIG. 13, a micro actuator for a vehicle applied to the cover of an automobile fuel tank or the cover of a charging case, which comprises a casing 1. The casing 1 comprises a motor chamber 2 and a locking chamber 3. The described motor chamber 2 is provided with electric locking components. The described electric locking components comprise a motor 4, transmission components and locking components 5 from top to bottom. The described motor 4 is connected and communicates with the automobile electronic control system. The described locking chamber 3 is provided with manual locking components. The described manual locking components comprise a rotary push rod 6, a driving sleeve 7 and a rotary sleeve 8 from top to bottom. The described rotary push rod 6 is in transmission connection with the cover of the automobile fuel tank. The described electric locking components can lock the described manual locking components. The described locking components 5 comprise a locking base 9 in the motor chamber 2 and in transmission connection with transmission components, a locking tab 10 in the locking chamber 3 for locking the rotary sleeve 8, and a hook arm 11 for connecting the locking base 9 and the locking tab 10. A passage suitable 12 for the hook arm 11 is provided between the described motor chamber 2 and the locking chamber 3. The wall of the described locking chamber 3 is provided with a locking hole 13 suitable for the described locking tab 10. The described passage 12 is connected with the described locking hole 13, which is facing the described rotary sleeve 8. The described locking tab 10 can pass through the described locking hole 13 and form an interference fit with the described rotary sleeve 8.

In this embodiment, the described locking hole 13 is located on the side of the described locking chamber 3 away from the motor chamber 2. By using the arrangement of the position of the locking hole 13 in this embodiment, the length of the passage 12 can be extended, so that the distance between the locking hole 13 and the motor chamber 2 can be extended, therefore, the time for water vapor to pass through passage 12 is longer and is more difficult. This structure has better sealing performance and can lower the probability of corrosion and damage to the motor due to water invasion.

In this embodiment, the end of the described passage 12 is provided with a baffle 14 in a protruding way. A limit bar 15 is provided in the described passage 12 near the baffle 14. A slideway 16 is formed between the described baffle 14 and limit bar 15, which is connected with the described locking hole 13. The described locking tab 10 is provided with a limit slider 17 in a protruding way, which is provided in the described slideway 16 in a sliding way. In order to prevent the locking tab 10 from being misplaced or jammed during the movement, in this embodiment, a slideway 16 is formed by the coordination of the baffle 14 and the limit bar 15. The slideway 16 is suitable for the limit slider 17 on the locking tab 10. When the motor 4 is started, the locking tab 10 can move back and forth along the slideway 16 and get effective limiting effect, which ensures that the locking tab 10 runs stably and reliably for a long time.

In this embodiment, the wall of the described locking chamber 3 is provided with several internal studs 18. The guide grooves 19 are formed between the adjacent internal studs 18. Each internal stud 18 is provided with a locking mouth 20. A first inclined surface 21 and a second inclined surface 22 with the same inclination direction are provided on both sides of the locking mouth 20. The described first inclined surface 21 is inclined toward the described lock opening 20. The described second inclined surface 22 is inclined toward the described guide grooves 19; several guide bars 23 are provided on the outer side of the described rotary sleeve 8. A third inclined surface 24 with the same inclination direction as the first inclined surface 21 is provided on the upper end of the guide bars 23. A locking gap 25 is formed between adjacent guide bars 23. The described locking tab 10 can be inserted into the locking gap 25 and form an interference fit with the described guide bars 23; a guide surface 26 suitable for the third inclined surface 24 is provided on the lower end of the described driving sleeve 7; it also comprises a first spring 27 and a second spring 28. The described rotary push rod 6 is provided with a casing 29. A support base 30 is provided in the described casing 29. The described first spring 27 is provided on the described support base 30 in a sleeve-type way. A support rod 31 is provided on the described casing 1 in a protruding way. The described second spring 28 is provided on the described support rod 31 in a sleeve-type way. One end of the support rod 31 extends into the described casing 29 and can be butted with the described support base 30; the described transmission components comprise a gear 32 provided on the output shaft of the described motor 4, a non-standard gear ring 33 meshed with the described gear 32, and a cam 34 provided on the described non-standard gear ring 33. The described locking base 9 is provided with a linkage groove 35. The described cam 34 is located in the described linkage groove 35 and forms an accessible connection with the described locking base 9. This embodiment provides the complete structure of the electric locking components and the manual locking components, corrects the defects of the conventional structure, and ensures the locking or unlocking of the small door of the filler cap or the charging cap. The structure is simple and practical. It avoids misoperation, plays the role of security, and increases the safety of the mechanism. Moreover, it improves the stability of the mechanism, reduces the friction and interference between the moving mechanisms when they return, effectively reduces the impact force and noise, and further improves the service life, safety and comfort of the whole product.

In this embodiment, the described motor chamber 2 is also provided with a gear ring seat 36. The described gear ring seat 36 is provided with a gear ring chamber 55 suitable for the gear ring seat 36. A shaft hole 37 is provided at the bottom of the described gear ring chamber 55. The described non-standard gear ring 33 is provided with a connecting shaft 38 downward in a protruding way. The described connecting shaft 38 passes through the described shaft hole 37 and extends out of the gear ring seat 36. The described cam 34 is provided on the described connecting shaft 38 in a sleeve-type way. Since the non-standard gear ring 33 is used, the structure of gear ring seat 36 provided by this embodiment is suitable for the non-standard gear ring 33 to ensure the normal and reliable operation of the transmission components. In the existing structure, there is no effective sealing structure in the motor chamber 2 and the locking chamber 3. Under the negative pressure formed by the expansion and contraction of the rotary push rod 6 inside and outside the actuator, the external water vapor will enter the locking chamber 3 through the dynamic clearance between the rotary push rod 6 and the casing 1, so the water vapor is likely to enter the motor chamber 2. As a result, the motor in the motor chamber 2 may be in a humid environment for a long time, the internal metal elements may rust, and then the motor may fail and cause failure of all functions of the whole actuator. In order to solve the above defects, in this embodiment, several support feet 39 are provided at the bottom of the described casing 1. The described gear ring seat 36 is erected on the described support feet 39. Sealing components 40 are also provided between the described gear ring seat 36 and the support feet 39. The described sealing components 40 comprise several layers of annular flexible glue 41 and a cushion 42 integrally formed with the annular flexible glue 41. The described cushion 42 is cut with an opening 43 corresponding to the described shaft hole 37. A skirt 44 is provided on the edge of the described opening 43, which is butted with the described connecting shaft 38 and forms an interference fit. The sealing components 40 with the special structure provided by this embodiment can provide a good sealing performance and effectively isolate and protect the motor 4 through the coordination of the annular flexible glue 41 and the cushion 42. The configuration of the skirt 44 makes the connecting shaft 38 and the sealing components 40 butted to obtain a seamless effect. It can provide better sealing performance on the premise of normal operation.

In this embodiment, the described gear ring seat 36 is also provided with a motor sealing seat 45. The described motor is provided on the described motor sealing seat 45. By setting the motor sealing seat 45, the motor 4 can be stably supported, and the sealing and moisture-proof effect of the motor 4 can be further improved.

In this embodiment, a spiral sliding groove 46 is cut on the outer surface of the described rotary push rod 6. The raised sliding points 47 are provided on the inner surface of the described locking chamber 3. The described sliding points 47 are provided in the described spiral chute 46 in a sliding way. The sliding points 47 and the spiral chute 46 cooperate to make the described rotary push rod 6 rotate when extending into or ejecting from the described locking chamber 3. When this embodiment is used, the rotary push rod 6 can move up and down according to the track of the spiral chute 46 and rotate by rotating it and the coordination of the sliding points 47 and the spiral chute 46, so that the rotary sleeve 8 can be driven to rotate through the driving sleeve 7 to enable the locking or return function.

In this embodiment, a fixing part 48 is provided integrally on the upper end of the described rotary sleeve 8. The described fixing part 48 is inserted into the described casing 29. The described fixing part 48 is provided with a ring groove 49. The described rotary push rod 6 is provided with a fixing hole 50. A clamp spring 51 is provided in the described fixing hole 50 in a clamping way. The described clamp spring 51 is clamped into the described ring groove 49. Pressing the described rotary push rod 6 can drive the described rotary sleeve 8 to rotate. In this embodiment, the clamp spring 51 is used to realize the connection structure between the rotary sleeve 8 and the rotary push rod 6, so that the rotary sleeve 8 can smoothly realize the function of moving forward while rotating after being pushed by the rotary push rod 6. It has a simpler structure, good stability and easy installation.

In this embodiment, an access opening 52 is provided on the side surface of the described casing 1, which is facing the described clamp spring 51. The described access opening 52 is provided with a sealing cover 53. A through-hole 54 connected with the described passage 12 is provided at the bottom of the described access opening 52. With the structure of this embodiment, when the internal components are stuck or misplaced, which causes the actuator to fail to start, shut down or operate normally, by setting the access opening 52, it is not necessary to remove the whole casing 1. Instead, as long as the sealing cover 53 is opened, the internal components (including but not limited to the clamp spring 51, the rotary sleeve 8, the rotary push rod 6, the driving sleeve 7 and the hook arm 11) can be adjusted directly with tools to eliminate the misplacement, so that the actuator can operate again.

The locking process of the present invention is as follows: Manually press the small door of the filler cap or the small door of the charging cap to make it butted with the rotary push rod 6. Then the rotary push rod 6 moves down and rotates under the force. At the same time, the rotary push rod 6 drives the rotary sleeve 8 to move down through the driving sleeve 7. After moving down a certain distance, the rotary sleeve 8 slides out of the guide groove 19. At this time, the rotary sleeve 8 moves away from the limit of the guide groove 19 and rotates. The guide bars 23 on the rotary sleeve 8 rotate to the position of the locking mouth 20 and are limited by the lock opening 20. As a result, the rotary push rod 6 is locked. At this time, the rotary push rod 6 is locked with the cover of the automobile fuel tank. At this time, when the locking signal is input, the motor 4 drives the gear 32 to rotate, the gear 32 drives the non-standard gear ring 33 to rotate, and the non-standard gear ring 33 drives the locking base 9 to move, so that the hook arm 11 moves forward and drives the locking tab 10 to insert into the locking gap 25 on the rotary sleeve 8, so as to enable the electric locking function of the manual locking components, and thus enable the safe closing of the cover of the automobile fuel tank.

The unlocking process of the present invention is as follows: When the unlocking signal is input, the motor 4 drives the gear 32 to rotate, the gear 32 drives the non-standard gear ring 33 to rotate, the non-standard gear ring 33 drives the locking base 9 to move, and the locking tab 10 successively exits the locking gap 25 to release the locking limit on the rotary sleeve 8, so as to enable the unlocking function of the electric locking part of the small door of the filler cap or the small door of the charging cap, and then the rotary push rod 6 can be unlocked. Then manually press the small door of the filler cap or the small door of the charging cap connected with the rotary push rod 6. Then the rotary push rod 6 moves downward under the force and drives the rotary sleeve 8 downward for a short distance, so that the guide bars 23 on the rotary sleeve 8 exit the lock opening 20, and then the rotary sleeve 8 rotates upward under the resilience of the second spring 28, so that the guide bars 23 on the rotary sleeve 8 enter the guide groove 19. At this time, release the small door of the filler cap or the small door of the charging cap, and the rotary push rod 6 and the rotary sleeve 8 continue to move upward under the action of the first spring 27 and the second spring 28 until they return to the initial position. At the same time, the rotary push rod 6 rotates and moves out of the slot on the small door of the filler cap or the small door of the charging cap. The unlocking function is enabled.

The above is only a good embodiment of the present invention and does not limit the present invention in any way. Any simple modifications, changes or equivalent structural variations made to the above embodiment according to the essence of the invention technology still fall within the protection scope of the technical scheme of the present invention.

The invention claimed is:

1. A micro actuator for a vehicle capable of being applied to the cover of an automobile fuel tank or the cover of a charging case, comprising a box wherein the box comprises a motor chamber and a locking chamber, wherein the motor chamber is provided with electric locking components, wherein the electric locking components comprise a motor, transmission components and latch components from top to bottom, wherein the locking chamber is provided with manual locking components, wherein the manual locking components comprise a rotary push rod, a driving sleeve and a rotary sleeve from top to bottom, wherein the electric locking components are capable of locking the described manual locking components, characterized in that the electric locking components comprise a locking base in the motor chamber and a transmission part connected with the transmission components, a locking tab in the locking chamber for locking the rotary sleeve of the manual locking components, and a hook arm for connecting the locking base and the locking tab, wherein a passage suitable for the hook arm is provided between the motor chamber and the locking chamber, wherein a wall of the locking chamber is provided with a locking hole suitable for the described locking tab, wherein the passage is connected with the locking hole, which faces the rotary sleeve, wherein the locking tab can pass through the locking hole and form an interference fit with the rotary sleeve, wherein the wall of the locking chamber is provided with several internal bugles, wherein each internal bugle is provided with a lock opening, wherein a first inclined plane and a second inclined plane with the same inclination direction are arranged on both sides of the lock opening, wherein the first inclined plane is inclined toward the lock opening and wherein the second inclined plane is inclined toward a guide groove;

wherein several guide bars are provided on the outer side of the described rotary sleeve, and a third inclined plane with the same inclination direction as the first inclined plane is provided on the upper end of the guide bars, wherein a locking gap is formed between adjacent guide bars and wherein a locking piece can be inserted into the locking gap to form an interference fit with the guide rod;

wherein a guide surface suitable for the third inclined plane is provided on the lower end of the described driving sleeve;

and wherein the guide surface comprises a first spring and a second spring, wherein the rotary push rod is provided with a receiving chamber, wherein a support base is provided in the receiving chamber, wherein the first spring is provided on the support base in a sleeving way and a support rod is provided on a casing in a protruding way, wherein the second spring is provided on the support rod in a sleeve-type way and one end of the support rod extends into the described receiving chamber and can be butted with the described support base, wherein the transmission components comprise a first gear provided on the output shaft of the motor, a non-standard gear ring meshed with said first gear, and a cam provided on the described non-standard gear ring, wherein a locking base is provided with a linkage groove and wherein the cam is located in the described linkage groove and forms an accessible connection with the described locking seat;

and further wherein the motor chamber is also provided with a gear ring seat, wherein the gear ring seat is provided with a gear ring chamber suitable for the gear ring seat, wherein a shaft hole is provided at the bottom of the gear ring chamber, wherein the non-standard gear ring is provided with a connecting shaft downward in a protruding way, wherein the connecting shaft passes through the shaft hole and extends out of the gear ring seat, and wherein the cam is provided on the described connecting shaft in a sleeve-type way;

wherein several supporting feet are provided at the bottom of the casing, wherein the gear ring seat is erected on the support feet, wherein sealing components are also provided between the gear ring seat and the supporting feet, wherein the sealing components comprise several layers of annular flexible glue and a cushion integrally formed with the annular flexible glue, wherein the cushion is cut with a shaft opening corresponding to the described shaft hole, and wherein a skirt is provided on the edge of the shaft opening, which is butted with the connecting shaft and forms an interference fit.

2. The micro actuator for vehicle according to claim 1, which is characterized in that the locking hole is located on the side of the locking chamber away from the motor chamber.

3. The micro actuator for a vehicle according to claim 1, which is characterized in that the end of the passage is provided with a baffle in a protruding way, wherein the baffle and a limit bar are formed between slideways, which is connected with the locking hole, wherein the locking tab is provided with a limit slider in a protruding way, which is provided in the slideway in a sliding way.

4. The micro actuator for a vehicle according to claim 1, which is characterized in that: The gear ring seat is also provided with a motor sealing seat wherein the motor is provided on the motor sealing seat.

5. The micro actuator for a vehicle according to claim 1, characterized in that: a spiral chute is cut on the outer surface of the rotary push rod, wherein convex sliding points are provided on the inner surface of the described locking chamber and the convex sliding points are provided in the spiral chute in a sliding way, wherein the bugles and the spiral chute cooperate to make the rotary push rod rotate when extending into or ejecting from the locking chamber.

6. The micro actuator for a vehicle according to claim 1, characterized in that: a fixing part is provided integrally on the upper end of the described rotary sleeve, wherein the fixing part is inserted into the receiving chamber, wherein the fixing part is provided with a ring groove, wherein the rotary push rod is provided with a fixing hole, wherein a clamp spring is provided in the fixing hole in a clamping way, wherein the clamp spring is clamped into the ring groove, and wherein the rotary sleeve rotates by pressing the rotary push rod.

7. The micro actuator for a vehicle according to claim 6, characterized in that: an access opening is provided on a side surface of the casing which is facing the described clamp spring, wherein the access opening is provided with a sealing cover and wherein a through-hole connected with the described passage is provided at the bottom of the access opening.

* * * * *